(12) United States Patent
Subramanian et al.

(10) Patent No.: US 9,210,689 B2
(45) Date of Patent: Dec. 8, 2015

(54) METHOD AND APPARATUS FOR EFFICIENT COMMUNICATION OF SAFETY MESSAGES FOR A GROUP OF USER EQUIPMENTS

(71) Applicant: QUALCOMM Incorporated, San Diego, CA (US)

(72) Inventors: Sundar Subramanian, Somerville, NJ (US); Sichao Yang, Basking Ridge, NJ (US); Xinzhou Wu, Monmouth Junction, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 13/875,652

(22) Filed: May 2, 2013

(65) Prior Publication Data

US 2014/0328241 A1  Nov. 6, 2014

(51) Int. Cl.
*H04L 12/28* (2006.01)
*H04W 72/00* (2009.01)
*H04W 4/08* (2009.01)
*H04W 4/04* (2009.01)

(52) U.S. Cl.
CPC .............. *H04W 72/005* (2013.01); *H04W 4/08* (2013.01); *H04W 4/046* (2013.01)

(58) Field of Classification Search
None
See application file for complete search history.

(56) References Cited

U.S. PATENT DOCUMENTS

| | | | |
|---|---|---|---|
| 7,848,278 B2 * | 12/2010 | Chen et al. | 370/328 |
| 7,899,621 B2 | 3/2011 | Breed et al. | |
| 2002/0138179 A1 * | 9/2002 | Payton et al. | 701/1 |
| 2005/0055417 A1 | 3/2005 | Reich et al. | |
| 2006/0052055 A1 * | 3/2006 | Rowse et al. | 455/41.1 |
| 2009/0285213 A1 | 11/2009 | Chen et al. | |
| 2010/0065728 A1 | 3/2010 | Choi et al. | |
| 2010/0144283 A1 | 6/2010 | Curcio et al. | |
| 2011/0210866 A1 | 9/2011 | David et al. | |
| 2012/0155465 A1 | 6/2012 | Lee et al. | |
| 2012/0223843 A1 | 9/2012 | Wall et al. | |
| 2012/0310518 A1 | 12/2012 | Chen et al. | |
| 2013/0157656 A1 * | 6/2013 | Gao et al. | 455/434 |

(Continued)

FOREIGN PATENT DOCUMENTS

WO   2011123755 A1   10/2011

OTHER PUBLICATIONS

International Search Report and Written Opinion—PCT/US2014/035857—ISA/EPO—Sep. 3, 2014.

(Continued)

*Primary Examiner* — Duc C Ho
(74) *Attorney, Agent, or Firm* — Arent Fox LLP

(57) ABSTRACT

A method, an apparatus, and a computer program product for wireless communication are provided in connection with communication of safety messages by a device on behalf of other devices in a group. In an example, a communications device is equipped to receive attribute information from one or more UEs in a group of UEs, generate group attribute information based on the received attribute information, and broadcast the group attribute information on behalf of the group of UEs. In such an aspect, the communications device is a member of the group of UEs, and the leader of the group of UEs. In another example, a communications device is equipped to transmit, by a UE, attribute information to a leader UE of a group of UEs, and prohibit broadcasting at least a portion of the attribute information. In such an aspect, the communications device is a member of the group of UEs.

60 Claims, 12 Drawing Sheets

(56) References Cited

U.S. PATENT DOCUMENTS

2013/0289824 A1* 10/2013 Mudalige et al. ............... 701/41
2013/0297690 A1* 11/2013 Lucero et al. ................. 709/204
2014/0122517 A1* 5/2014 Vendrow ....................... 707/769
2014/0214872 A1* 7/2014 Herring ......................... 707/758
2014/0226639 A1* 8/2014 Yi et al. ........................ 370/336
2014/0286293 A1* 9/2014 Jang et al. .................... 370/329
2014/0321367 A1* 10/2014 Marupaduga et al. ........ 370/329

OTHER PUBLICATIONS

Partial International Search Report—PCT/US2014/035857—ISA/EPO—Jul. 29, 2014.
Tsai H.W., et al., "Maintaining Cohesive Fleets via Swarming with Small-World Communications," Vehicular Networking Conference (VNC), 2009 IEEE, Oct. 2009, pp. 28-3-3-1 to 28-3-3-8.

* cited by examiner

METHOD AND APPARATUS FOR EFFICIENT COMMUNICATION OF SAFETY MESSAGES FOR A GROUP OF USER EQUIPMENTS

BACKGROUND

1. Field

The present disclosure relates generally to communication systems, and more particularly, to communication of safety messages by a device on behalf of other devices in a group.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is LTE. LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE may support direct device-to-device (peer-to-peer) communication.

As the demand for D2D communication increases, there exists a need for methods/apparatuses for supporting various D2D communication configurations within LTE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with communication of safety messages by a device on behalf of other devices in a group. In an example, a communications device is equipped to receive attribute information from one or more UEs in a group of UEs, generate group attribute information based on the received attribute information, and broadcast the group attribute information on behalf of the group of UEs. In such an aspect, the communications device is a member of the group of UEs, and the leader of the group of UEs. In another example, a communications device is equipped to transmit, by a UE, attribute information to a leader UE of a group of UEs, and prohibit broadcasting at least a portion of the attribute information. In such an aspect, the communications device is a member of the group of UEs.

According to related aspects, a method for communication of safety messages by a device on behalf of other devices in a group is provided. The method can include receiving, by a user equipment (UE), attribute information from one or more UEs in a group of UEs. In an aspect, the UE may be a member of the group of UEs, and may be a leader of the group of UEs. Further, the method can include generating group attribute information based on the received attribute information. Moreover, the method may include broadcasting the group attribute information on behalf of the group of UEs.

Another aspect relates to a communications apparatus enabled to communicate of safety messages on behalf of other devices in a group. The communications apparatus can include means for receiving, by a UE, attribute information from one or more UEs in a group of UEs. In an aspect, the UE may be a member of the group of UEs, and may be a leader of the group of UEs. Further, the communications apparatus can include means for generating group attribute information based on the received attribute information. Moreover, the communications apparatus can include means for broadcasting the group attribute information on behalf of the group of UEs.

Another aspect relates to a communications apparatus. The apparatus can include a processing system configured to receive, by a UE, attribute information from one or more UEs in a group of UEs. In an aspect, the UE may be a member of the group of UEs, and may be a leader of the group of UEs. Further, the processing system may be configured to generate group attribute information based on the received attribute information. Moreover, the processing system may further be configured to broadcast the group attribute information on behalf of the group of UEs.

Still another aspect relates to a computer program product, which can have a computer-readable medium including code for receiving, by a UE, attribute information from one or more UEs in a group of UEs. In an aspect, the UE may be a member of the group of UEs, and may be a leader of the group of UEs. Further, the computer-readable medium may include code for generating group attribute information based on the received attribute information. Moreover, the computer-readable medium can include code for broadcasting the group attribute information on behalf of the group of UEs.

According to related aspects, a method for communication of safety messages to with leader device of a group of device is provided. The method can include transmitting, by a UE, attribute information to a leader UE of a group of UEs. In an aspect, the UE may be a member of the group of UEs. Moreover, the method may include prohibiting broadcasting of at least a portion of the attribute information outside of the group of UEs.

Another aspect relates to a communications apparatus enabled to communicate of safety messages with a leader device of a group of device. The communications apparatus can include means for transmitting, by a UE, attribute information to a leader UE of a group of UEs. In an aspect, the UE may be a member of the group of UEs. Moreover, the communications apparatus can include means for prohibiting broadcasting of at least a portion of the attribute information outside of the group of UEs.

Another aspect relates to a communications apparatus. The apparatus can include a processing system configured to transmit, by a UE, attribute information to a leader UE of a group of UEs. In an aspect, the UE may be a member of the group of UEs. Moreover, the processing system may further be configured to prohibit broadcasting of at least a portion of the attribute information outside of the group of UEs.

Still another aspect relates to a computer program product, which can have a computer-readable medium including code for transmitting, by a UE, attribute information to a leader UE of a group of UEs. In an aspect, the UE may be a member of the group of UEs. Moreover, the computer-readable medium can include code for prohibiting broadcasting of at least a portion of the attribute information outside of the group of UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
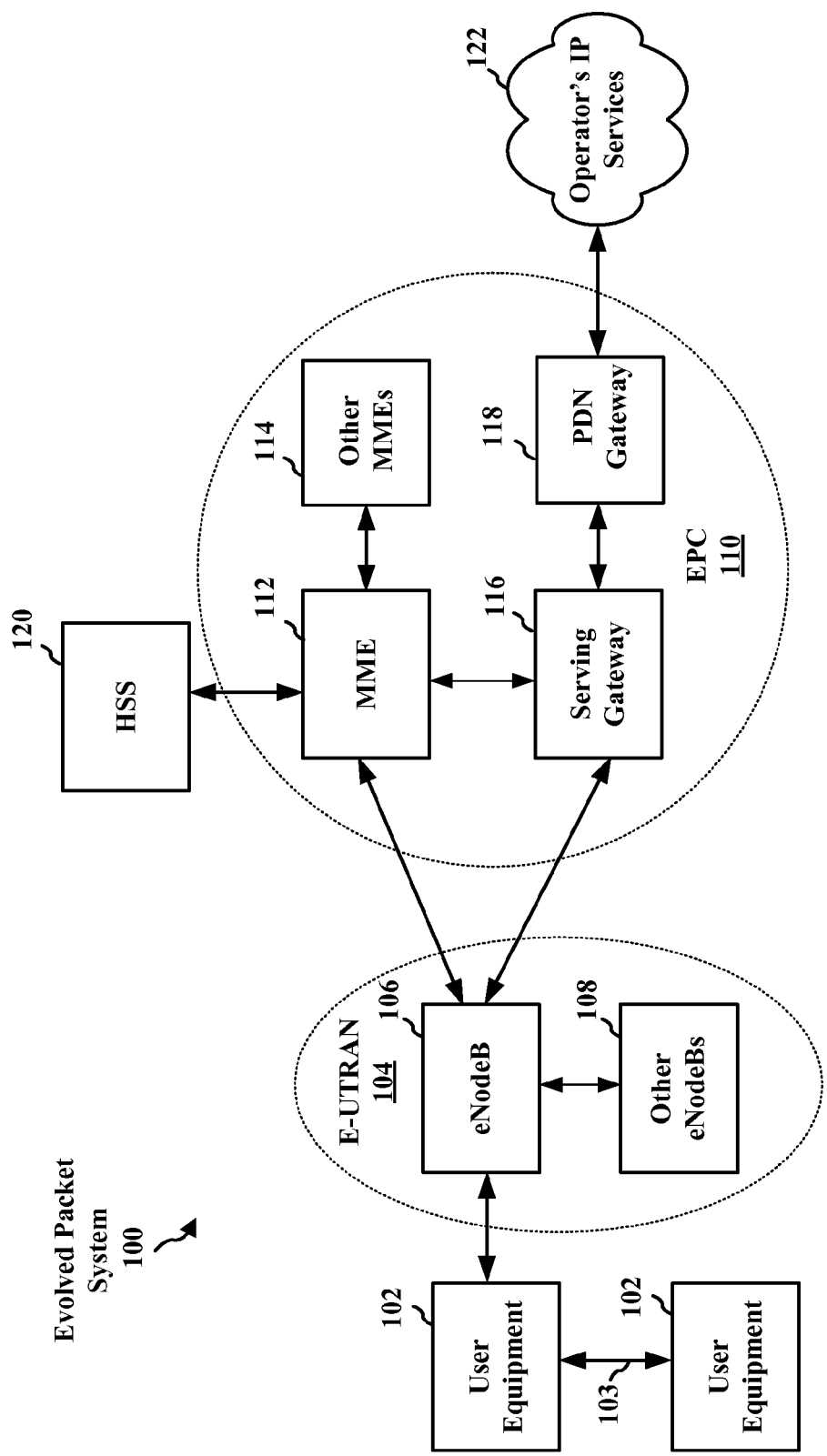
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The UEs 102 may form a D2D connection 103. In an aspect, the D2D connection 103 may be configured to allow the UEs 102 to communicate with each other. In another aspect, a UE 102 may act as a leader of a group of UEs that are able to communicate with each other using the D2D connection 103. Examples of D2D connection 103 are provided with reference to IEEE 802.11p based communications. IEEE 802.11p based dedicated short range communications (DSRC) wave systems provide a basic safety message format where devices (e.g., vehicles) periodically may announce their position, velocity and other attributes to other devices (e.g., other vehicles) allowing the neighboring traffic to track their positions and avoid collisions, improve traffic flow, etc. Further, the communication protocols in these systems do not preclude pedestrians (with their user equipment (UEs)) from utilizing this spectrum and periodically transmitting the basic safety messages which can indicate information such as their presence to vehicles around them.

The eNB 106 is connected by an 51 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
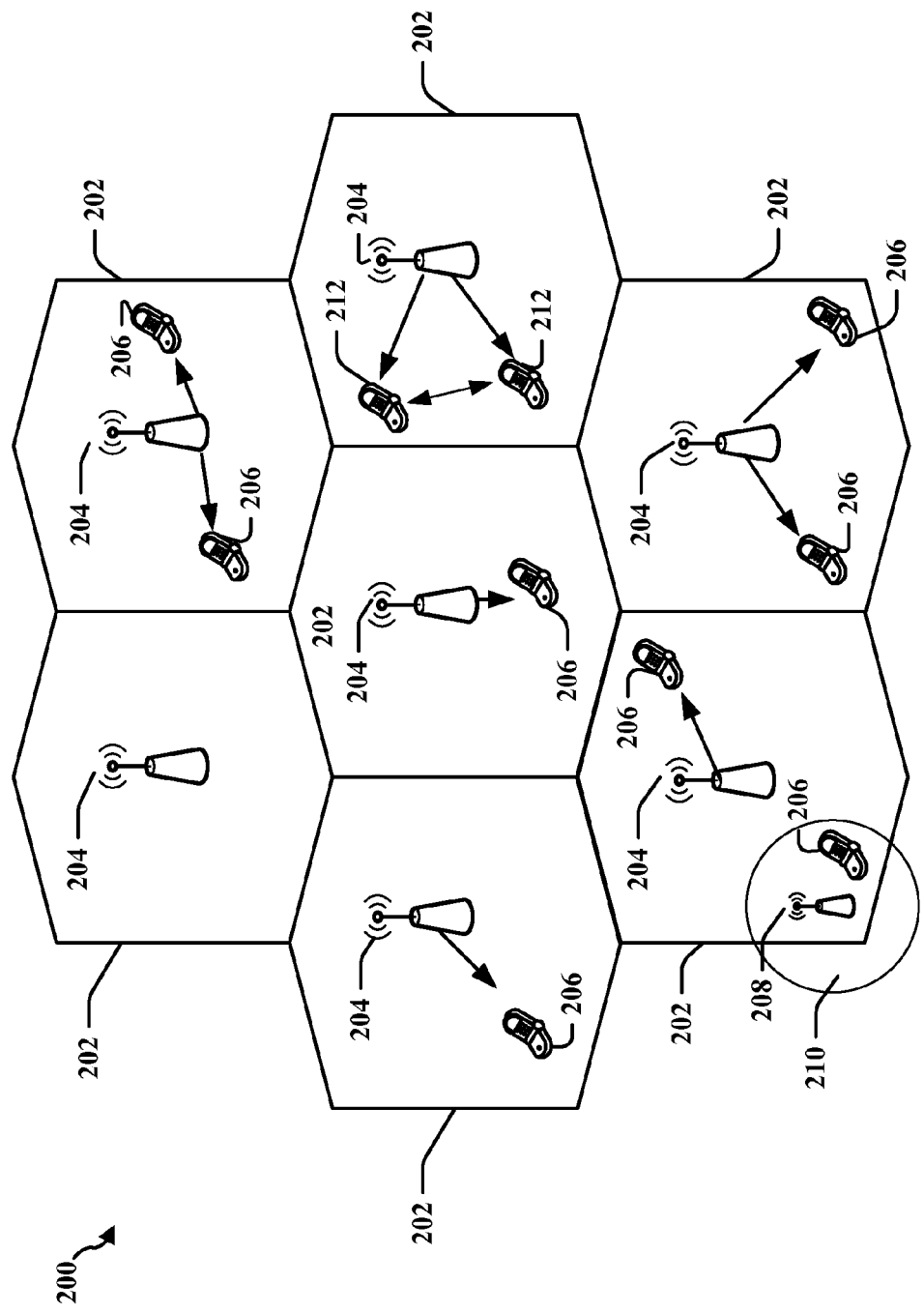
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206, 212 in the cells 202. Some of the UEs 212 may be in device-to-device communication. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
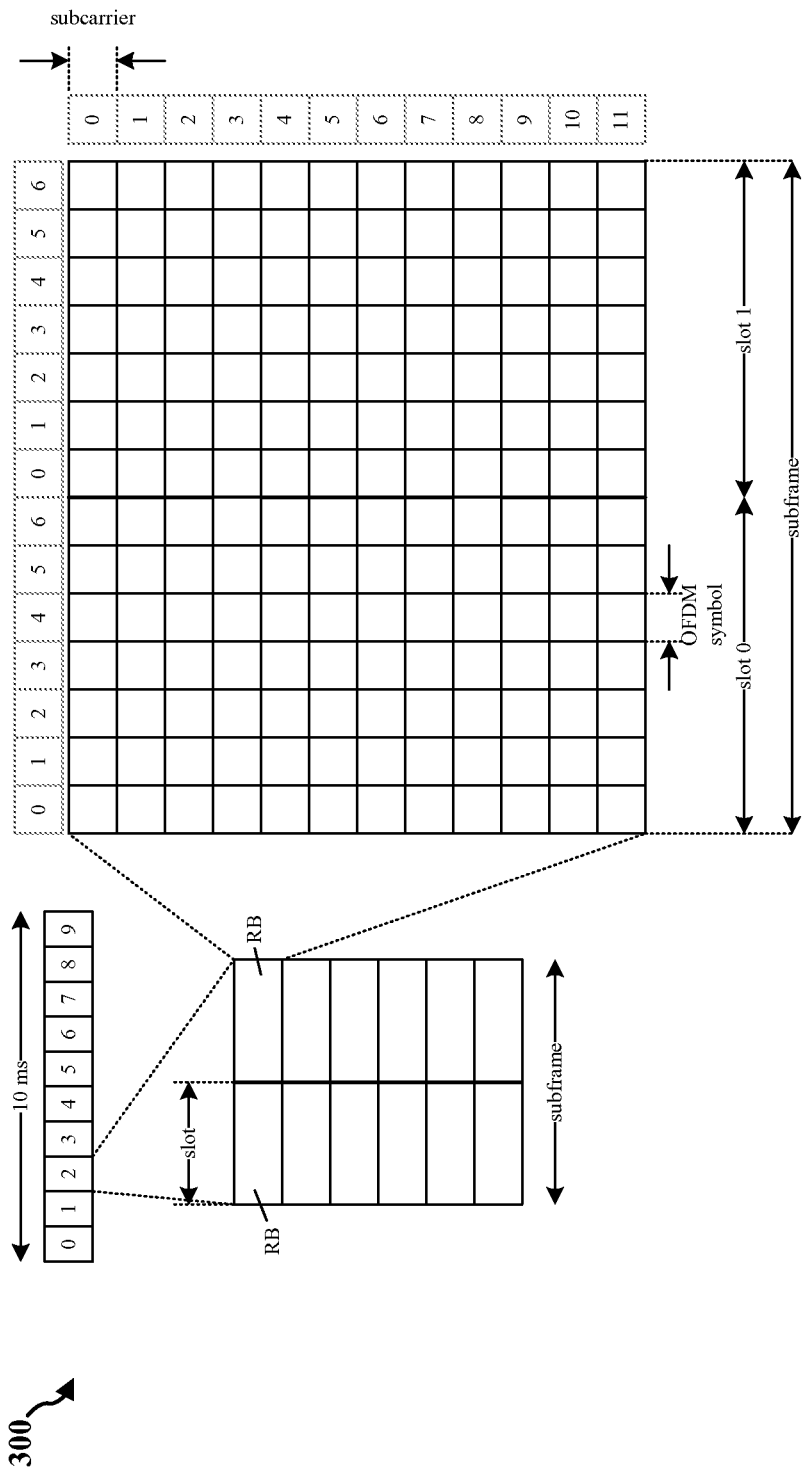
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. A physical DL control channel (PDCCH), a physical DL shared channel (PDSCH), and other channels may be mapped to the resource elements.

Figure 4:
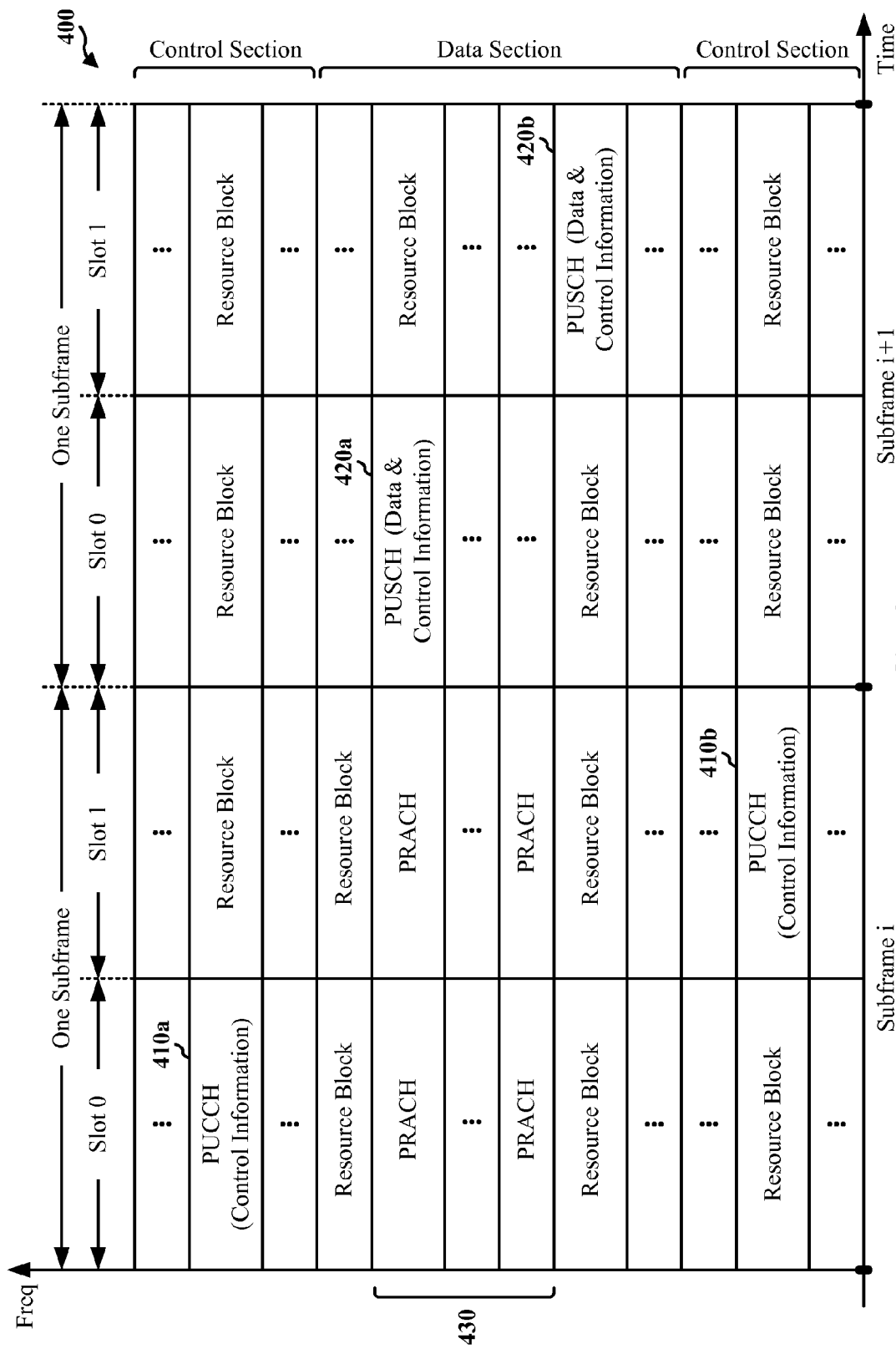
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
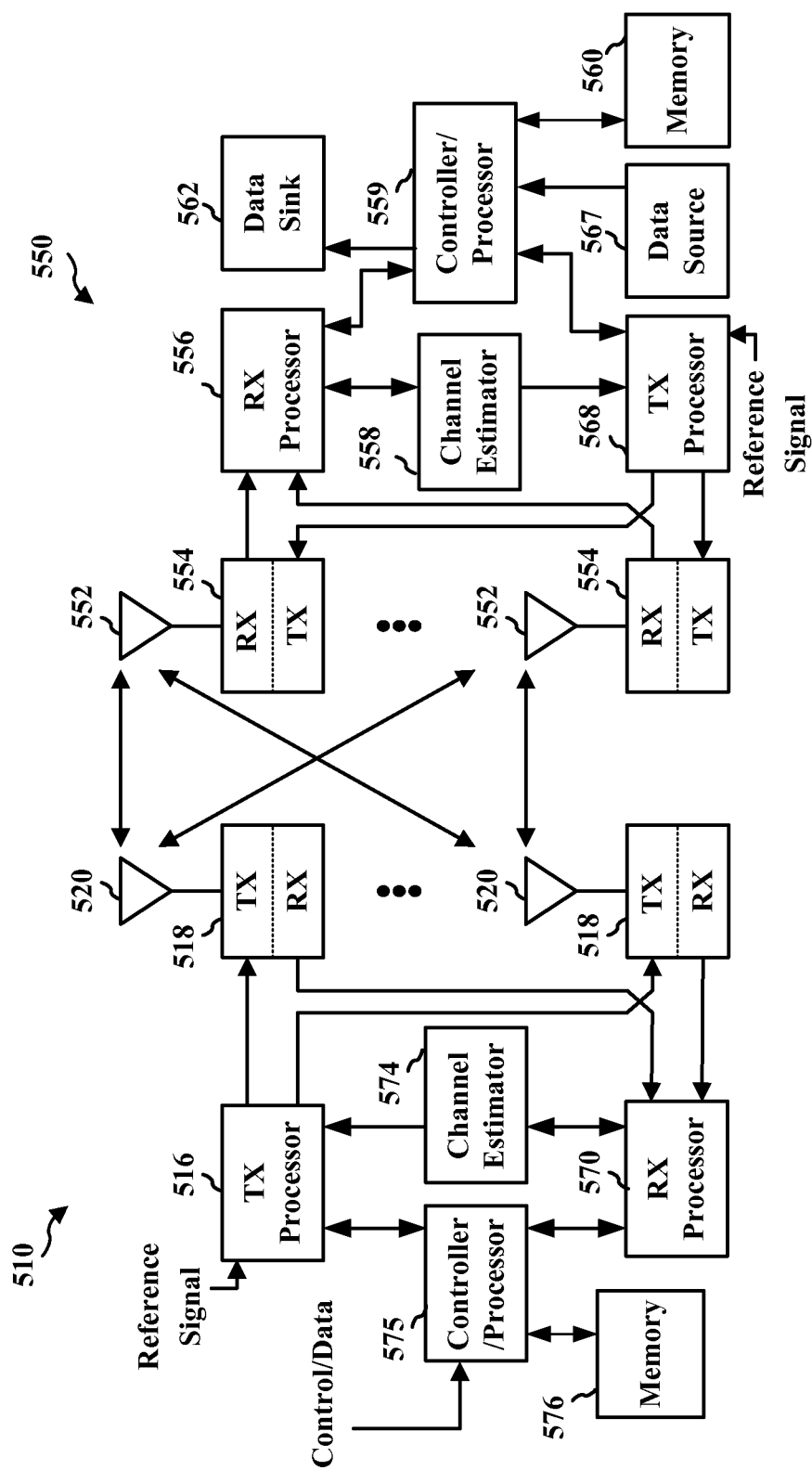
FIG. 5 is a diagram illustrating an example of an evolved Node B and user equipment in an access network.

FIG. 5 is a block diagram of an eNB 510 in communication with a UE 550 in an access network. In the DL, upper layer packets from the core network are provided to a controller/processor 575. The controller/processor 575 implements the functionality of the L2 layer. In the DL, the controller/processor 575 provides header compression, ciphering, packet segmentation and reordering, multiplexing between logical and transport channels, and radio resource allocations to the UE 550 based on various priority metrics. The controller/processor 575 is also responsible for HARQ operations, retransmission of lost packets, and signaling to the UE 550.

The transmit (TX) processor 516 implements various signal processing functions for the L1 layer (i.e., physical layer). The signal processing functions includes coding and interleaving to facilitate forward error correction (FEC) at the UE 550 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 550. Each spatial stream is then provided to a different antenna 520 via a separate transmitter 518TX. Each transmitter 518TX modulates an RF carrier with a respective spatial stream for transmission.

At the UE 550, each receiver 554RX receives a signal through its respective antenna 552. In another aspect, UE 550 may communicate with other UEs similarly to how UE 550 communicates with eNB 510. Each receiver 554RX recovers information modulated onto an RF carrier and provides the information to the receive (RX) processor 556. The RX processor 556 implements various signal processing functions of the L1 layer. The RX processor 556 performs spatial processing on the information to recover any spatial streams destined for the UE 550. If multiple spatial streams are destined for the UE 550, they may be combined by the RX processor 556 into a single OFDM symbol stream. The RX processor 556 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 510. These soft decisions may be based on channel estimates computed by the channel estimator 558. The soft decisions are then decoded and deinterleaved to recover the data and control signals that were originally transmitted by the eNB 510 on the physical channel. The data and control signals are then provided to the controller/processor 559.

The controller/processor 559 implements the L2 layer. The controller/processor can be associated with a memory 560 that stores program codes and data. The memory 560 may be referred to as a computer-readable medium. In the UL, the controller/processor 559 provides demultiplexing between transport and logical channels, packet reassembly, deciphering, header decompression, control signal processing to recover upper layer packets from the core network. The upper layer packets are then provided to a data sink 562, which represents all the protocol layers above the L2 layer. Various control signals may also be provided to the data sink 562 for L3 processing. The controller/processor 559 is also responsible for error detection using an acknowledgement (ACK) and/or negative acknowledgement (NACK) protocol to support HARQ operations.

In the UL, a data source 567 is used to provide upper layer packets to the controller/processor 559. The data source 567 represents all protocol layers above the L2 layer. Similar to the functionality described in connection with the DL transmission by the eNB 510, the controller/processor 559 implements the L2 layer for the user plane and the control plane by providing header compression, ciphering, packet segmentation and reordering, and multiplexing between logical and transport channels based on radio resource allocations by the eNB 510. The controller/processor 559 is also responsible for HARQ operations, retransmission of lost packets, and signaling to the eNB 510.

Channel estimates derived by a channel estimator 558 from a reference signal or feedback transmitted by the eNB 510 may be used by the TX processor 568 to select the appropriate coding and modulation schemes, and to facilitate spatial processing. The spatial streams generated by the TX processor 568 are provided to different antenna 552 via separate transmitters 554TX. Each transmitter 554TX modulates an RF carrier with a respective spatial stream for transmission.

The UL transmission is processed at the eNB 510 in a manner similar to that described in connection with the receiver function at the UE 550. Each receiver 518RX receives a signal through its respective antenna 520. Each receiver 518RX recovers information modulated onto an RF carrier and provides the information to a RX processor 570. The RX processor 570 may implement the L1 layer.

The controller/processor 575 implements the L2 layer. The controller/processor 575 can be associated with a memory 576 that stores program codes and data. The memory 576 may be referred to as a computer-readable medium. In the UL, the controller/processor 575 provides demultiplexing between transport and logical channels, packet reassembly, deciphering, header decompression, control signal processing to recover upper layer packets from the UE 550. Upper layer packets from the controller/processor 575 may be provided to the core network. The controller/processor 575 is also responsible for error detection using an ACK and/or NACK protocol to support HARQ operations.

Figure 6:
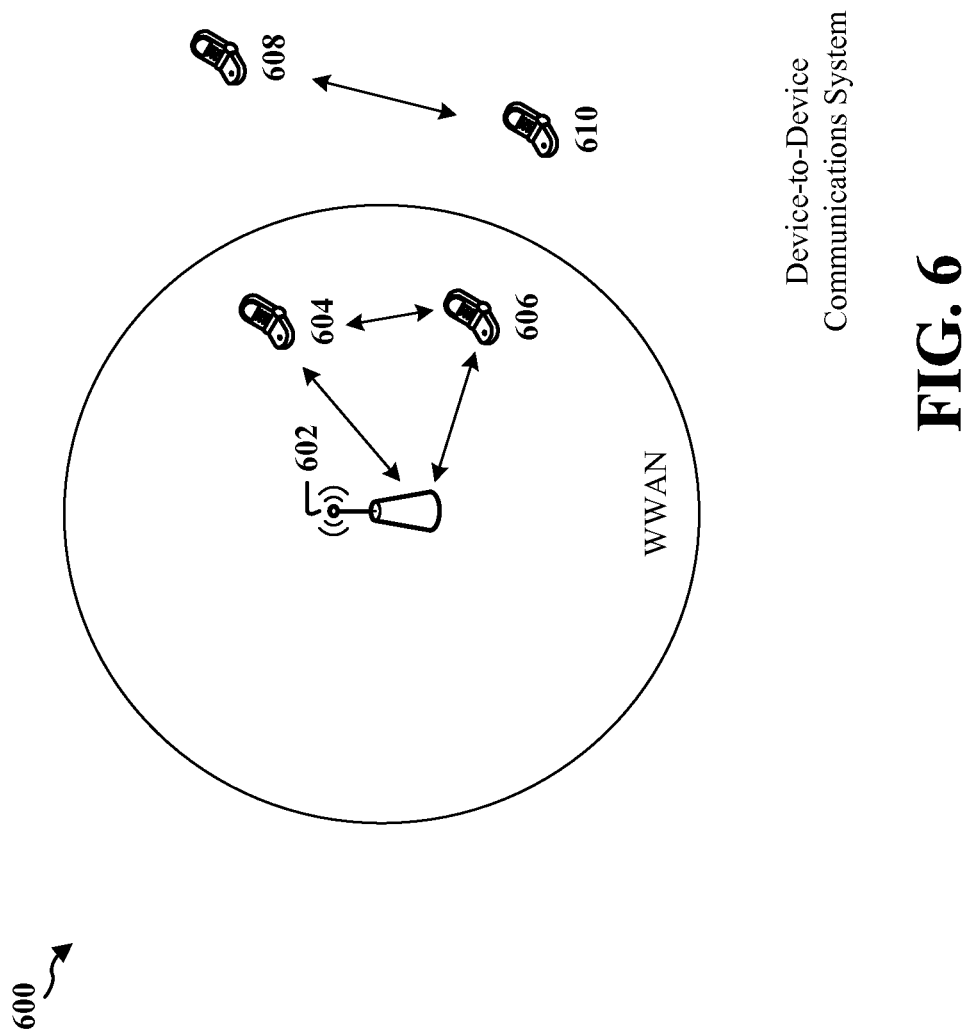
FIG. 6 is a diagram illustrating a device-to-device communications network.

FIG. 6 is a diagram of a device-to-device communications system 600. The device-to-device communications system 600 includes a plurality of wireless devices 604, 606, 608, 610. The device-to-device communications system 600 may overlap with a cellular communications system, such as for example, a wireless wide area network (WWAN). Some of the wireless devices 604, 606, 608, 610 may communicate together in device-to-device communication using the DL/UL WWAN spectrum, some may communicate with the base station 602, and some may do both. For example, as shown in FIG. 6, the wireless devices 608, 610 are in device-to-device communication and the wireless devices 604, 606 are in device-to-device communication. The wireless devices 604, 606 are also communicating with the base station 602.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on Flash-LinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 7:
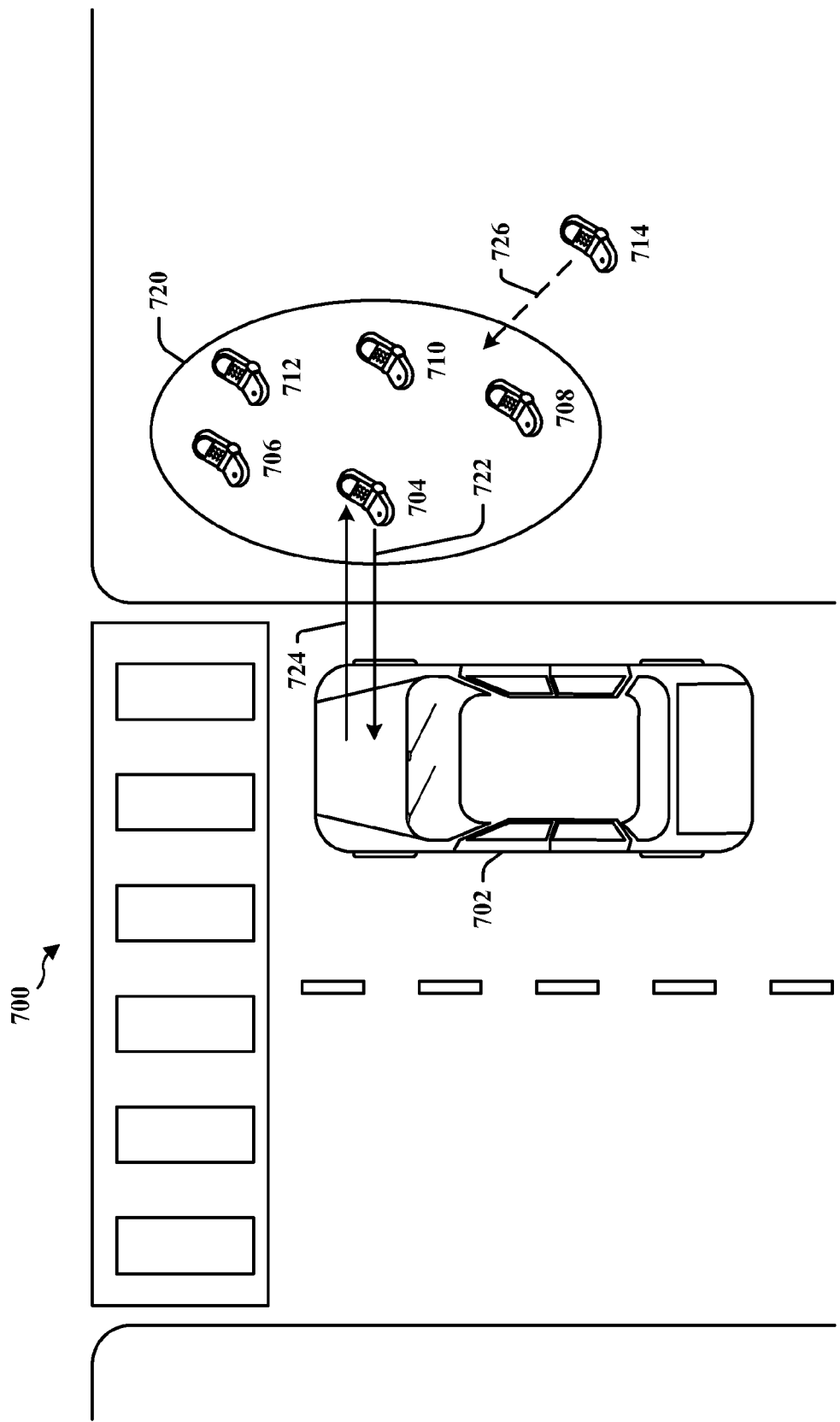
FIG. 7 is a diagram illustrating a device-to-device communications network that is configured to efficient communication of safety information for a group of user equipments, according to an aspect.

FIG. 7 is a diagram of a communications system 700 that is configured to support device-to-device communications. In an aspect, the communications system 700 may further support IEEE 802.11p based communications. For example, device 702 (e.g., vehicle) may use dedicated short range communications (DSRC) wave systems to communicate basic safety messages 724 (BSMs) including position, velocity, etc. information. Such communications may allow device 702 to communicate with other cars allowing the neighboring traffic to track their positions and avoid collisions, improve traffic flow, etc. Further, the communication protocols that may be used in communications system 700 do not preclude pedestrians (with their user equipment (UEs)) from utilizing this spectrum and periodically transmitting BSMs which can indicate information such as their presence to vehicles around them. In some scenarios, such as a busy street crossing, the density of pedestrian users (e.g., UEs 704-714) may be quite high, and as such, transmission of BSMs by each pedestrian may result in a vehicle 702 receiving a large number of similar messages. This may be distracting for the vehicular user 702 and/or also congest the communications system 700. Further, the transmissions may also significantly burden the battery of the pedestrian device (e.g., UEs 704-714).

In an aspect, multiple UEs (e.g., UEs 704-712) may form a group of UEs 720. In such an aspect, a UE 704 of the group of UEs 720 may be selected to communicate group attribute information 722 of behalf of the group of UEs. In an aspect, one or more sensors associated with a UE (e.g., camera, microphone GPS, etc.) may be used to determine that there other UEs are within a threshold distance and available to form the group of UEs 720. In an aspect, the attribute information may include, but is not limited to, position information for the group of UEs (e.g. based on combined GPS measurements), speed information for the group of UEs, size information for the group of UEs, an indication of an intent to cross a road, conditions (e.g., disability designation for user, child present with user, etc.) associated with one or more UEs in the group of UEs, etc. In an aspect, the group of UEs 720 may be formed where there are more than a threshold number of UEs within a close proximity of each other (e.g., 5 UEs).

In an aspect, the group of UEs 720 may communicate within the group in a manner that does not congest the wireless network. In such an aspect, the UEs (e.g., UEs 704-712) may use a lower transmit power to communicate within the group of UEs 720. In another aspect, the UEs (e.g., UEs 704-712) may use a different access technology (e.g., LTE based device-to-device communications, Bluetooth based communications, etc.) to communicate within the group of UEs 720.

In an aspect, the group of UEs 720 may select a leader UE 704 based on factors, such as but not limited to, a remaining battery level, a time of admission into the group of UEs, one or more UE transmission capabilities, etc. In another aspect, the leader UE 704 may be randomly selected.

Further, a UE (e.g., UE 714) may leave or enter the group of UEs 720. In such an aspect, the UE 714 may transmit a group admittance message 726, and may receive a confirmation indicating acceptance into the group. In such an aspect, the UE 714 may then communicate attribute information to be aggregated and communicated by the leader UE 704.

Figure 8:
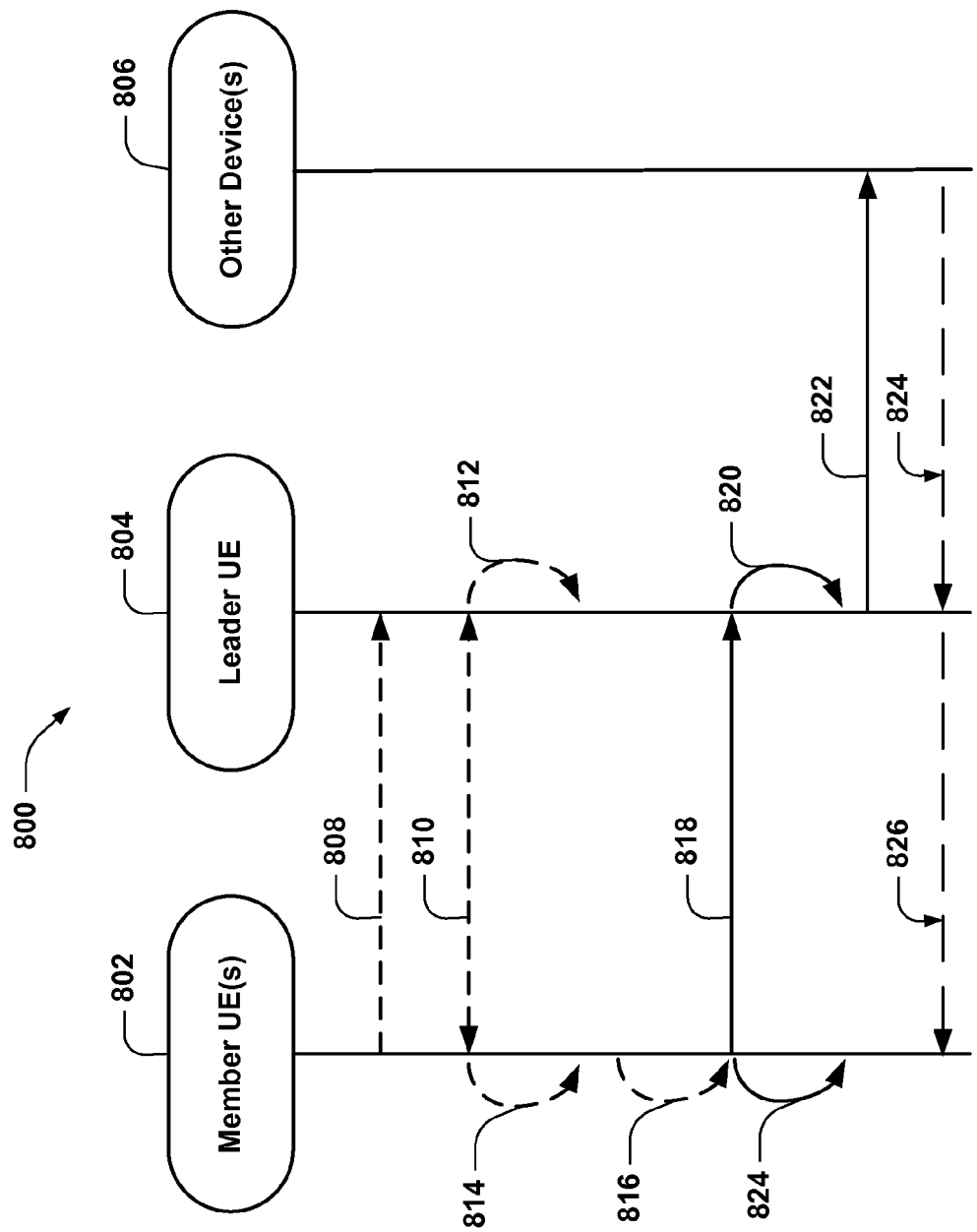
FIG. 8 is a call-flow diagram illustrating an example communications system that includes multiple UEs and one or more other devices, according to an aspect.

FIG. 8 depicts a call flow diagram in an example communications system 800 that includes multiple UEs (802, 804) and one or more other devices 806 (e.g., vehicles). In an aspect, the multiple UEs (802, 804) may be part of a group of UEs which include member UEs 802 and at least one leader UE 804.

In an optional aspect, at act 808, a UE 802 may exchange one or more messages to ascertain membership in a group of UEs (802, 804), such as but not limited to pedestrians walking together.

In another optional aspect, at act 810, the group of UEs (802, 804) may communicate UE information to assist in determining a leader UE 804 of the group of UEs (802, 804). In an aspect, one or more sensors associated with a UE (e.g., camera, microphone GPS, etc.) may be used to determine that that other UEs are within a threshold distance and available to form the group.

In such an optional aspect, at acts 812, 814, the UEs may determine which UEs are member UEs 802 and which one or more UEs are leader UEs 804. In an aspect, the leader UE may be selected randomly. In an aspect, the UE information may include information such as, but not limited to, a remaining battery level, a time of admission into the group of UEs, one or more UE transmission capabilities. In an aspect in which the UE information includes a remaining battery level, the UE with the most remaining battery life may be selected as the leader UE 804. In an aspect in which the UE information includes time of admission into the group of UEs, the UE that has been in the group the longest time may be selected as the leader UE 804. In another aspect in which the UE information includes time of admission into the group of UEs, the UE that has been in the group the shortest time may be selected as the leader UE 804. In an aspect, the leadership determination may be performed periodically, in response to one or more user requests, based on occurrence of an event (arrival at an intersection, etc.), based on a change in the group membership (e.g., reduction/increase in the group size by a threshold amount), etc.

In another optional aspect, at act 816, each of the one or more member UEs 802 may obtain attribute information (e.g., UE location, velocity, special conditions (disability, etc.).

At act 818, the member UEs 802 may transmit the attribute information to the leader UE 804. In an aspect, the member UEs 802 may transmit at a low power to be heard within the small group of UEs (802, 804).

At act 820, the leader UE 804 may generate group attribute information based on the received attribute information. In an aspect, the group attribute information may include information, such as but not limited to, position information for the group of UEs (e.g. based on combined GPS measurements), speed information for the group of UEs, size information for the group of UEs, an indication of an intent to cross a road, conditions (e.g., disability, child, etc.) associated with one or more UEs in the group of UEs.

At act 822, the leader UE 804 may broadcast the group attribute information to be accessed by one or more other devices 806 (e.g., vehicles). In an aspect, the broadcast may use 802.11p based DSRC protocols.

In an optional aspect, at act 824, the member UEs 802 may reduce the duty cycle of their modules associated with obtaining the attribute information.

In another optional aspect, at act 826, one or more of the other devices 806 may transmit a basic safety message (BSM) that is received by the leader UE 804. In such an optional aspect, the leader UE 804 may share the one or more BSMs with member UEs 802 in a message-digest form.

As such a system and method for enabling a leader UE 804 to transmit safety messages on behalf of member UEs 802 is depicted.

Figure 9:
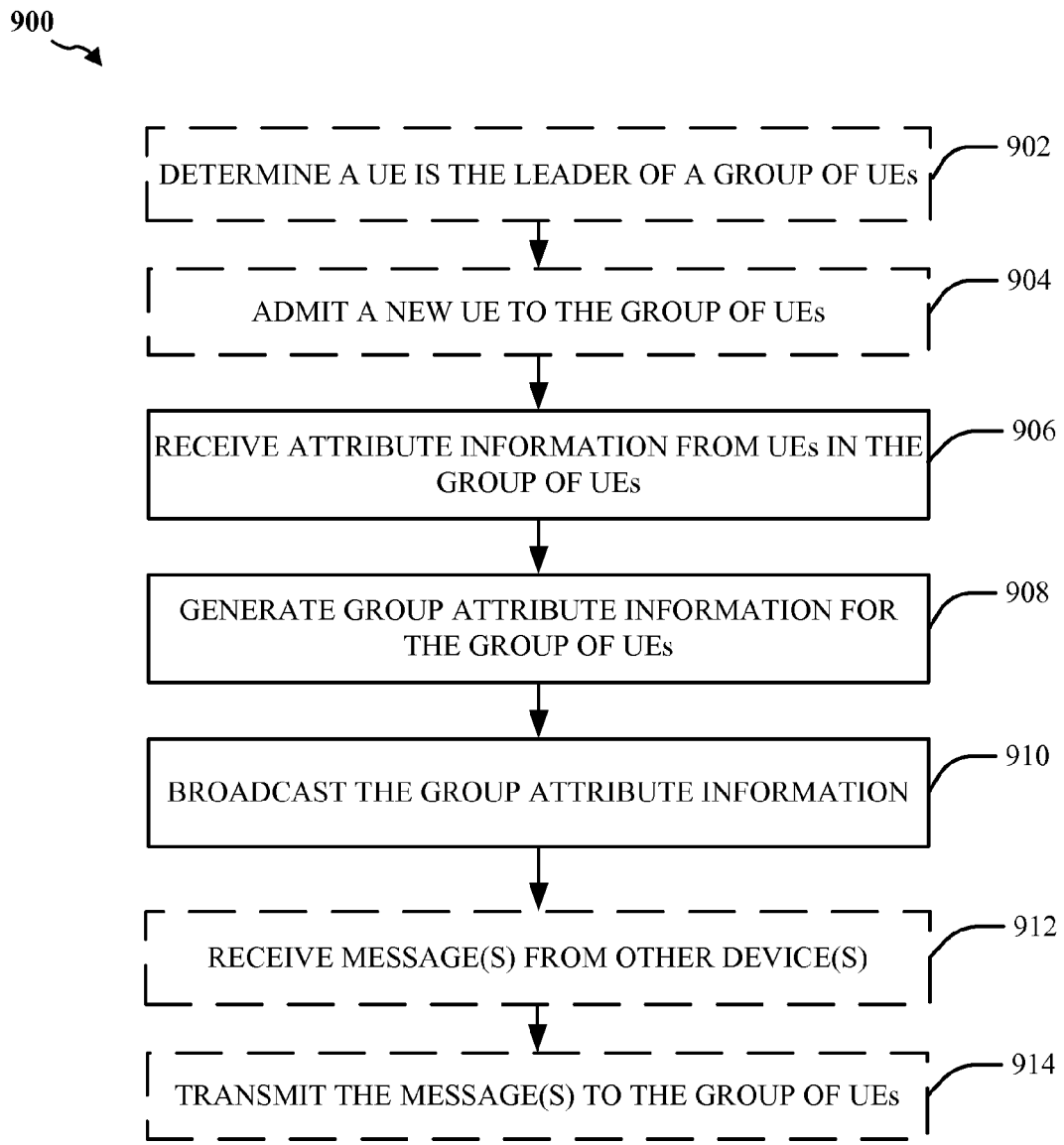
FIG. 9 is a flow chart of a first method of wireless communication.

FIG. 9 is a flow chart 900 of a first method of wireless communication. The method may be performed by a UE (e.g., UE 704 through UE 714). Further, the functionality described in the blocks depicted in flow chart 900 may be performed by various modules (1104, 1106, 1108, 1110, 1112) associated in the example apparatus 1102 depicted in FIG. 11.

In an optional aspect, at block 902, a UE may determine that it is a leader of a group of UEs. In an aspect, the leader determination may be performed by group leadership determination module 1106. In such an aspect, the determination 1122 may be based on information 1120 received, via reception module 1104 from other UEs (e.g., UEs 706-712). In an aspect, the UE may be determined to be the leader by receiving UE information from each of the UEs in the group of UEs, and determining that the UE is the leader of the group of UEs based on the UE information. In such an aspect, the UE information may include a remaining UE battery life, and the leadership determination 1122 may be based on the remaining UE battery life. In another aspect, UE leadership determination 1122 may be determined through a random process. Further, the determination 1122 may be indicated to UE attribute information module 1108 and/or group attribute information generation module 1110.

In an optional aspect, at block 904, the UE admit a new UE to the group of UEs. In such an aspect, the UE may receive a group admittance message from the new UE, and add the new UE. Further, the UE may transmit a confirmation message to the new UE. In an aspect, reception module 1104, and group leadership determination module 1106 may admit a new UE 714 upon reception of an admittance request 1130. Further, group leadership module may provide a confirmation 1132 to the new UE 714, via transmission module 1112 that it has been accepted into the group of UEs.

At block 906, the UE may receive attribute information from the UEs in the group of UEs. In an aspect, the attribute information 1120 may be received, via reception module 1104, from the UEs (706-712) in the group of UEs 720 with a low transmit power, use of a different access technology, etc.

At block 908, the UE may generate group attribute information for the group of UEs. In an aspect, the attribute information 1120 may be provided to group attribute information generation module 1110 to be aggregated with the UE attribute information 1124 from UE attribute information module 1108 to form the group attribute information 1126. In an aspect, the group attribute information may include position information for the group of UEs, speed information for the group of UEs, size information for the group of UEs, an indication of an intent to cross a road, a condition associated with one or more UEs in the group of UEs, etc.

At block 910, the UE may broadcast the group attribute information on behave of the group of UEs. In an aspect, group attribute information generation module 1110 may provide the group attribute information 1126 for broadcasting to one or more other devices (e.g., vehicle 702).

In an optional aspect, at block 912, the UE may receive one or more messages from one or more other devices. In such an aspect, reception module 1104 may receive the one or more messages 1128 from a device 702.

In such an optional aspect, at block 914, the UE may transmit a message to the group of UEs based on the received message. In such an aspect, the apparatus 1102 may use transmission module 1112 to transmit the received message 1128. Further, the message may be transmitted to a message-digest form to the UEs in the group (e.g., UEs 706-712).

Figure 10:
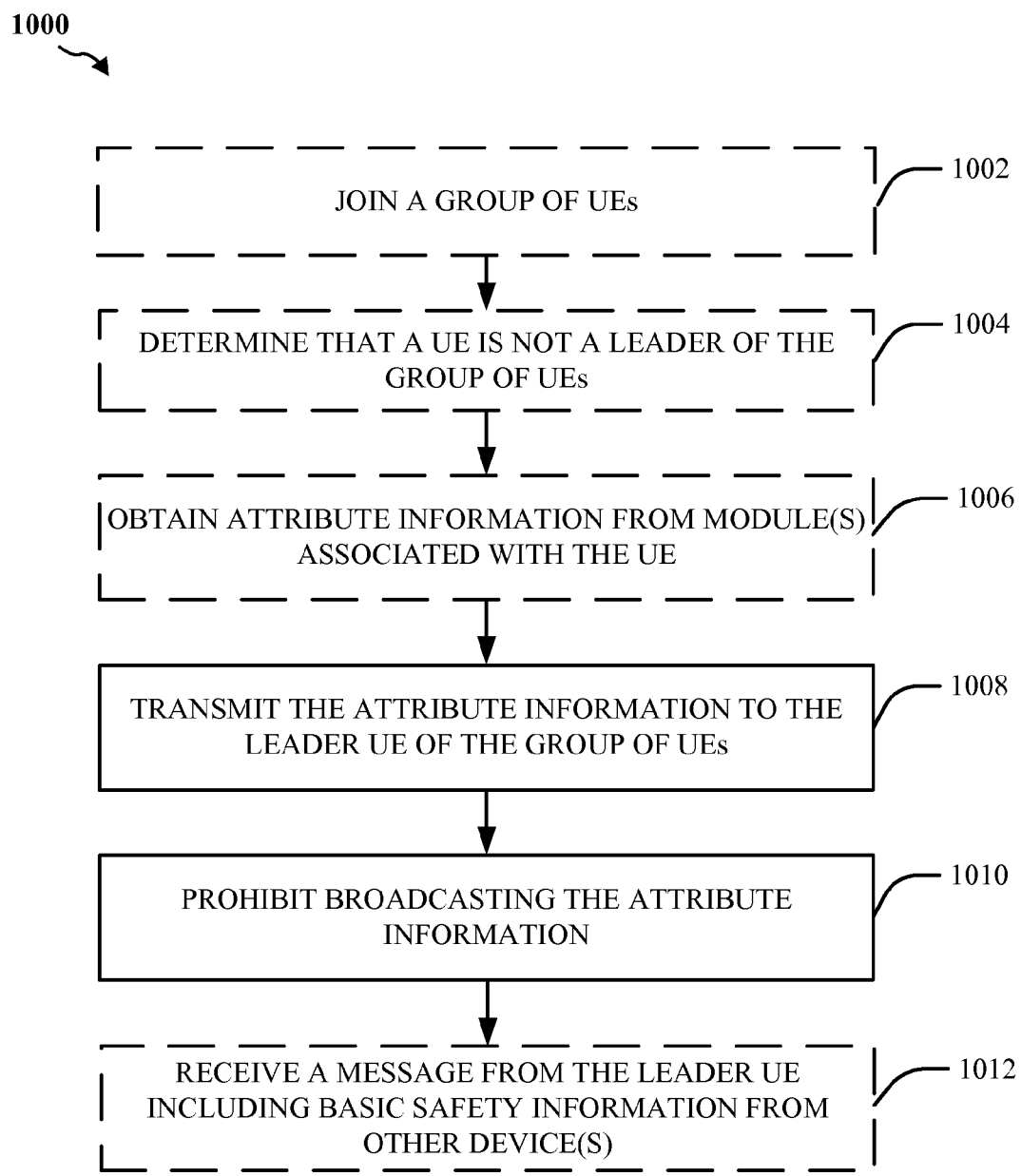
FIG. 10 is a flow chart of a second method of wireless communication

FIG. 10 is a flow chart 1000 of a second method of wireless communication. The method may be performed by a UE (e.g., UE 704 through UE 714). Further, the functionality described in the blocks depicted in flow chart 900 may be performed by various modules (1104, 1106, 1108, 1110, 1112) associated in the example apparatus 1102 depicted in FIG. 11.

In an optional aspect, at block 1002, a UE may join a group of UEs. As used herein, the group of UEs may be formed from the communication of the UE with one or more other UEs. In other words, the group of UEs may include as few as two UEs after the UE has joined. In an aspect, to join the group of UEs, the UE may transmit a group admittance message to one or more UEs of the group of UEs, and receive a confirmation message indicating admission into the group of UEs. In such an aspect, the transmission may be performed by transmission module 1112 and reception may be performed by reception module 1104.

In an optional aspect, at block 1004, the UE may determine that it is not a leader of the group of UEs. In an aspect, the determination 1122 may be performed by group leadership determination module 1106. In an aspect, group leadership determination module 1106 may receive other UE information 1120 from one or more UEs of the group of UEs, and determine that the UE is not a leader of the group of UEs based on analysis of UE's own information 1124 and the received other UE information 1120. In an aspect, the UE information may include information such as, but not limited to, remaining battery life, time of admission into the group, transmission capabilities, etc.

In an optional aspect, at block 1006, the UE may obtain attribute information form one or more modules associated with the UE. In an aspect, the UE attribute information module 1108 may obtain the information 1124. Further, the UE may prompt the modules used to obtain the information to reduce their duty cycles. Such a duty cycle reduction may save UE battery power.

At block 1008, the UE may transmit attribute information to the leader UE of the group of UEs. In an aspect, UE attribute information module 1108 may provide the UE attribute information 1124 to transmission module 1112 for transmission. In an aspect, the transmission may be performed with a low transmit power, use of a different access technology, etc.

At block 1010, the UE may prohibit broadcasting of at least a portion of the attribute information outside of the group of UEs. In an aspect, as part of the leadership determination 1122 the group leadership determination module 1106 may prompt the UE to not broadcast the UE attribute information 1124 outside the group of UEs.

In an optional aspect, at block 1012, the UE may receive a message from the leader UE of the group of UEs including one or more basic safety messages from one or more other devices (e.g., device 702). In an aspect, the message may be received using reception module 1104. In an aspect, the message may be in a message-digest form.

Figure 11:
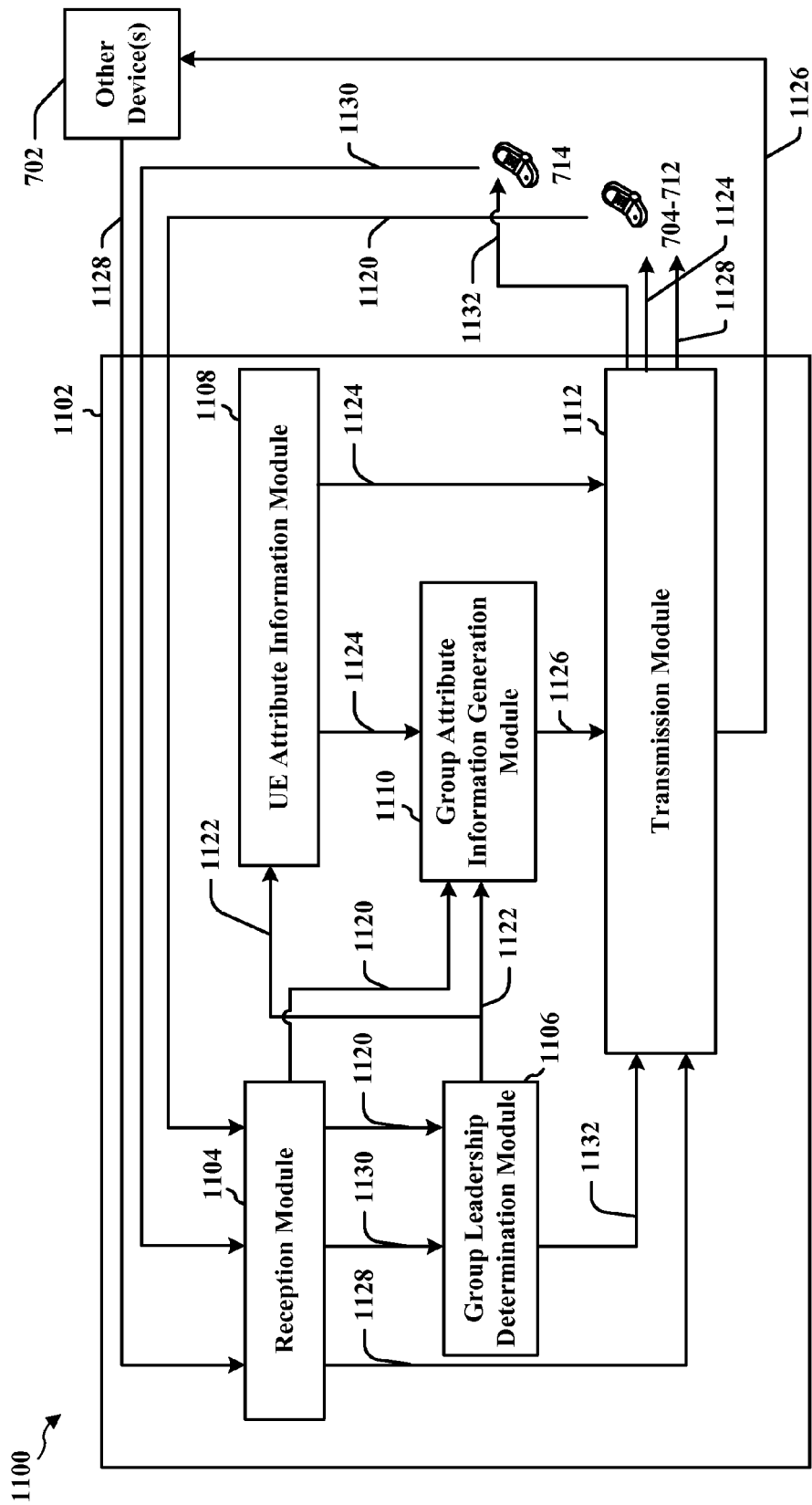
FIG. 11 is a conceptual data flow diagram illustrating the data flow between different modules/means/components in an exemplary apparatus.

FIG. 11 is a conceptual data flow diagram 1100 illustrating the data flow between different modules/means/components in an example apparatus 1102. The apparatus may be a UE (e.g., UE 704, UE 706, UE 708, UE 710, UE 712, UE 714). As described with reference to FIGS. 9, and 10, the apparatus 1102 includes a reception module 1104, group leadership determination module 1106, UE attribute information module 1108, group attribute information generation module 1110, and transmission module 1112.

Figure 12:
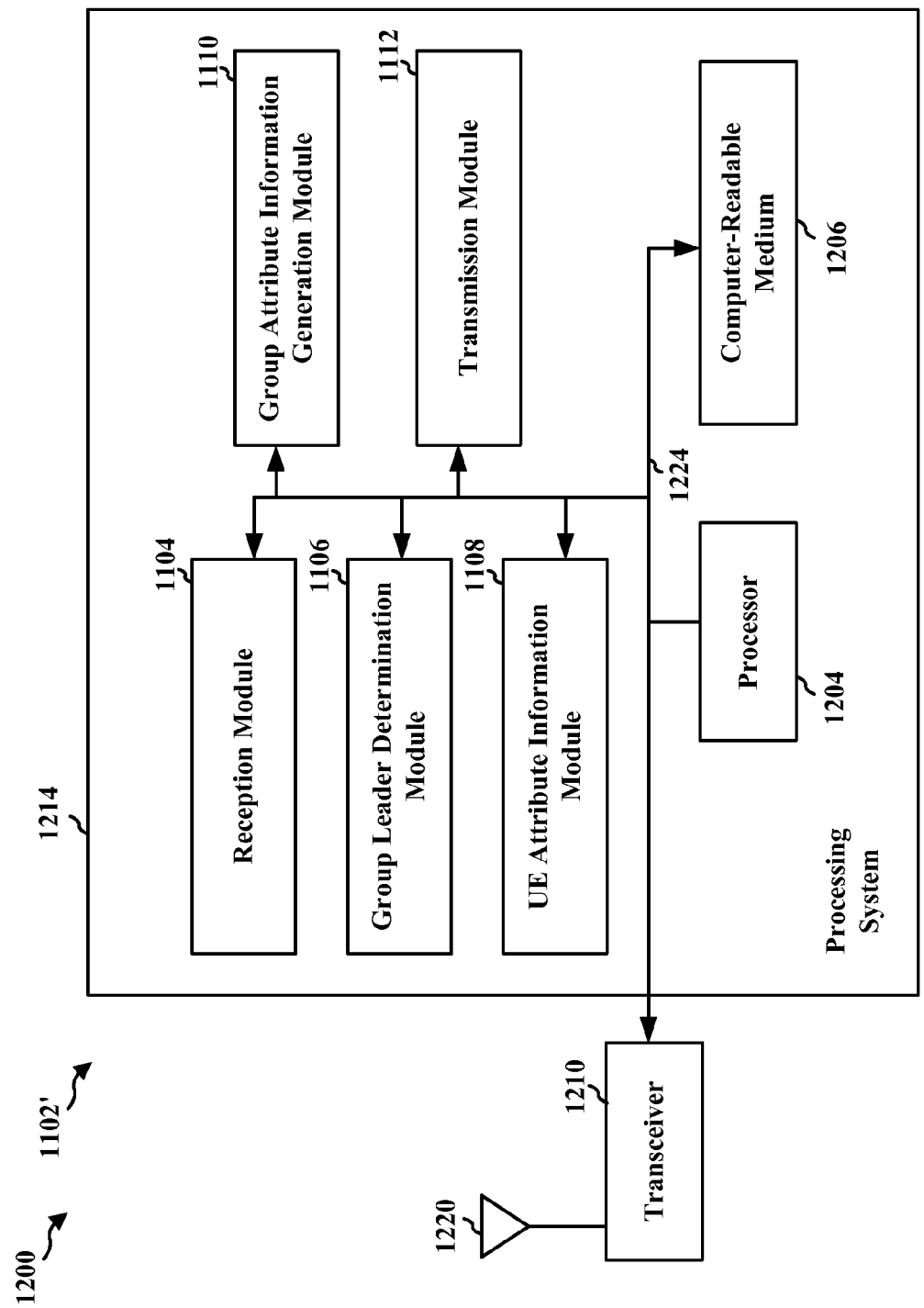
FIG. 12 is a diagram illustrating an example of a hardware implementation for an apparatus employing a processing system.

The apparatus may include additional modules that perform each of the steps of the algorithm in the aforementioned call flow diagram of FIG. 8 and flow charts of FIGS. 9 and 10. As such, each act/block in the aforementioned call flow diagram and flow charts of FIGS. 8, 9 and 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1104, 1106, 1108, 1110, and 1112. The modules may be software modules running in the processor 1204, resident/stored in the computer-readable medium 1206, one or more hardware modules coupled to the processor 1204, or some combination thereof. The processing system 1214 may be a component of the UE 550 and may include the memory 560 and/or at least one of the TX processor 568, the RX processor 556, and the controller/processor 559.

In one configuration, the apparatus 1102/1102' for wireless communication includes means for receiving, by a user equipment (UE), attribute information from one or more UEs in a group of UEs, means for generating group attribute information based on the received attribute information, and means for broadcasting the group attribute information on behalf of the group of UEs. In an aspect, the UE may be a member and a leader of the group of UEs. In an aspect, the apparatus 1102/1102' means for receiving may be further configured to receive UE information from each of the UEs in the group of UEs. In such an aspect, the apparatus 1102/1102' may include means for determining that the UE is the leader of the group of UEs based on the UE information. In an aspect, the apparatus 1102/1102' means for receiving may be further configured to receive a group admittance message from a new UE. In such an aspect, the apparatus 1102/1102' may include means for adding the new UE to the group of UEs. In an aspect, the apparatus 1102/1102' means for receiving may be further configured to receive one or more messages from one or more other devices, and the means for broadcasting may be further configured to transmit a message to the group of UEs including the one or more basic safety messages in a message-digest form.

In another configuration, the apparatus 1102/1102' for wireless communication includes means for transmitting, by a UE, attribute information to a leader UE of a group of UEs, and means for prohibiting broadcasting of at least a portion of the attribute information outside of the group of UEs. In an aspect, the UE may be a member of the group of UEs. In an aspect, the apparatus 1102/1102' may further include means for obtaining the attribute information form one or more modules associated with the UE, and means for reducing a duty cycle for the one or more modules upon transmission of the attribute information. In an aspect, the apparatus 1102/1102' means for transmitting may be further configured to transmit a group admittance message to one or more UEs of the group of UEs. In such an aspect, the apparatus 1102/1102' may include means for receiving a confirmation message indicating admission into the group of UEs. In an aspect, the apparatus 1102/1102' means for transmitting may be further configured to broadcast UE information to the group of UEs. In such an aspect, the apparatus 1002/1002 may include means for receiving UE information from one or more UEs of the group of UEs, and means for determining that the UE is not a new leader of the group of UEs based on analysis of the UE information and the received UE information. In an aspect, the apparatus 1102/1102' may further include means for receiving a message from the leader UE of the group of UEs including one or more basic safety messages from one or more other devices.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 568, the RX Processor 556, and the controller/processor 559. As such, in one configuration, the aforementioned means may be the TX Processor 568, the RX Processor 556, and the controller/processor 559 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
   receiving, by a user equipment (UE), attribute information from one or more UEs in a group of UEs, wherein the UE is a member of the group of UEs, and wherein the UE is a leader of the group of UEs;
   generating group attribute information based on the received attribute information; and
   broadcasting the group attribute information on behalf of the group of UEs to one or more other devices outside of the group of UEs.

2. The method of claim 1, further comprising:
   receiving UE information from each of the UEs in the group of UEs; and
   determining that the UE is the leader of the group of UEs based on the UE information.

3. The method of claim 2, wherein the UE information comprises a remaining battery life, and wherein the determining further comprises determining that the UE has a remaining battery life greater than any of the UEs in the group of UEs.

4. The method of claim 1, wherein the UE is selected as the leader of the group of UEs through a random process.

5. The method of claim 1, further comprising:
   receiving a group admittance message from a new UE; and
   adding the new UE to the group of UEs,
   wherein the UE also receives attribute information from the new UE.

6. The method of claim 1, wherein the attribute information is received from the one or more UEs with a low transmit power.

7. The method of claim 1, wherein the group attribute information comprises at last one of:
   position information for the group of UEs;
   speed information for the group of UEs;
   size information for the group of UEs;
   an indication of an intent to cross a road; or
   a condition associated with one or more UEs in the group of UEs.

8. The method of claim 1, further comprising:
   receiving one or more messages from one or more other devices; and
   transmitting a message to the group of UEs including the one or more basic safety messages in a message-digest form.

9. A method of wireless communications, comprising:
   transmitting, by a user equipment (UE), attribute information to a leader UE of a group of UEs, wherein the UE is a member of the group of UEs;
   prohibiting broadcasting of at least a portion of the attribute information outside of the group of UEs; and
   receiving a message from the leader UE of the group of UEs that includes one or more basic safety messages from one or more other devices within the group of UEs, wherein the message that includes the one or more basic safety messages is received based on group attribute information associated with the group of UEs.

10. The method of claim 9, wherein the attribute information is transmitted to the leader UE using a low transmit power.

11. The method of claim 9, further comprising:
    obtaining the attribute information from one or more modules associated with the UE; and
    reducing a duty cycle for the one or more modules upon transmission of the attribute information.

12. The method of claim 9, further comprising:
    transmitting a group admittance message to one or more UEs of the group of UEs; and
    receiving a confirmation message indicating admission into the group of UEs.

13. The method of claim 9, further comprising:
    broadcasting UE information to the group of UEs;
    receiving other UE information from one or more UEs of the group of UEs; and
    determining that the UE is not a new leader of the group of UEs based on analysis of the UE information and the received other UE information.

14. The method of claim 13, wherein the UE information comprises at least one of:
    a remaining battery power value; or
    a time of admission to the group of UEs.

15. The method of claim 9, wherein the message is in a message-digest form.

16. An apparatus for communication, the apparatus being a user equipment (UE) and comprising:
    means for receiving, by the UE, attribute information from one or more UEs in a group of UEs, wherein the UE is a member of the group of UEs, and wherein the UE is a leader of the group of UEs;
    means for generating group attribute information based on the received attribute information; and
    means for broadcasting the group attribute information on behalf of the group of UEs to one or more other devices outside of the group of UEs.

17. The apparatus of claim 16, further comprising:
    means for receiving UE information from each of the UEs in the group of UEs; and
    means for determining that the UE is the leader of the group of UEs based on the UE information.

18. The apparatus of claim 17, wherein the UE information comprises a remaining battery life, and wherein the means for determining is further configured to determine that the UE has a remaining battery life greater than any of the UEs in the group of UEs.

19. The apparatus of claim 16, wherein the UE is selected as the leader of the group of UEs through a random process.

20. The apparatus of claim 16, further comprising:
means for receiving a group admittance message from a new UE; and
means for adding the new UE to the group of UEs,
wherein the means for receiving attribute information is further configured to receive attribute information from the new UE.

21. The apparatus of claim 16, wherein the attribute information is received from the one or more UEs with a low transmit power.

22. The apparatus of claim 16, wherein the group attribute information comprises at last one of:
position information for the group of UEs;
speed information for the group of UEs;
size information for the group of UEs;
an indication of an intent to cross a road; or
a condition associated with one or more UEs in the group of UEs.

23. The apparatus of claim 16, further comprising:
means for receiving one or more messages from one or more other devices; and
means for transmitting a message to the group of UEs including the one or more basic safety messages in a message-digest form.

24. An apparatus for wireless communications, the apparatus being a user equipment (UE) and comprising:
means for transmitting, by the UE, attribute information to a leader UE of a group of UEs, wherein the UE is a member of the group of UEs;
means for prohibiting broadcasting of at least a portion of the attribute information outside of the group of UEs; and
means for receiving a message from the leader UE of the group of UEs that includes one or more basic safety messages from one or more other devices within the group of UEs, wherein the message that includes the one or more basic safety messages is received based on group attribute information associated with the group of UEs.

25. The apparatus of claim 24, wherein the attribute information is transmitted to the leader UE using a low transmit power.

26. The apparatus of claim 24, further comprising:
means for obtaining the attribute information from one or more modules associated with the UE; and
means for reducing a duty cycle for the one or more modules upon transmission of the attribute information.

27. The apparatus of claim 24, further comprising:
means for transmitting a group admittance message to one or more UEs of the group of UEs; and
means for receiving a confirmation message indicating admission into the group of UEs.

28. The apparatus of claim 24, further comprising:
means for broadcasting UE information to the group of UEs;
means for receiving other UE information from one or more UEs of the group of UEs; and
means for determining that the UE is not a new leader of the group of UEs based on analysis of the UE information and the received other UE information.

29. The apparatus of claim 28, wherein the UE information comprises at least one of:
a remaining battery power value; or
a time of admission to the group of UEs.

30. The apparatus of claim 24, wherein the message is in a message-digest form.

31. An apparatus for communication, the apparatus being a user equipment (UE) and comprising:
a memory; and
at least one processor coupled to the memory and configured to:
receive, by the UE, attribute information from one or more UEs in a group of UEs, wherein the UE is a member of the group of UEs, and wherein the UE is a leader of the group of UEs;
generate group attribute information based on the received attribute information; and
broadcast the group attribute information on behalf of the group of UEs to one or more other devices outside of the group of UEs.

32. The apparatus of claim 31, wherein the at least one processor is further configured to:
receive UE information from each of the UEs in the group of UEs; and
determine that the UE is the leader of the group of UEs based on the UE information.

33. The apparatus of claim 32, wherein the UE information comprises a remaining battery life, and wherein the at least one processor is further configured to determine that the UE has a remaining battery life greater than any of the UEs in the group of UEs.

34. The apparatus of claim 31, wherein the UE is selected as the leader of the group of UEs through a random process.

35. The apparatus of claim 31, wherein the at least one processor is further configured to:
receive a group admittance message from a new UE;
add the new UE to the group of UEs; and
receive attribute information from the new UE.

36. The apparatus of claim 31, wherein the attribute information is received from the one or more UEs with a low transmit power.

37. The apparatus of claim 31, wherein the group attribute information comprises at last one of:
position information for the group of UEs;
speed information for the group of UEs;
size information for the group of UEs;
an indication of an intent to cross a road; or
a condition associated with one or more UEs in the group of UEs.

38. The apparatus of claim 31, wherein the at least one processor is further configured to:
receive one or more messages from one or more other devices; and
transmit a message to the group of UEs including the one or more basic safety messages in a message-digest form.

39. An apparatus for communication, the apparatus being a user equipment (UE) and comprising:
a memory; and
at least one processor coupled to the memory and configured to:
transmit, by the UE, attribute information to a leader UE of a group of UEs, wherein the UE is a member of the group of UEs;
prohibit broadcasting of at least a portion of the attribute information outside of the group of UEs; and
receive a message from the leader UE of the group of UEs that includes one or more basic safety messages from one or more other devices within the group of UEs, wherein the message that includes the one or more basic safety messages is received based on group attribute information associated with the group of UEs.

40. The apparatus of claim 39, wherein the attribute information is transmitted to the leader UE using a low transmit power.

41. The apparatus of claim 39, wherein the at least one processor is further configured to:
obtain the attribute information from one or more modules associated with the UE; and
reduce a duty cycle for the one or more modules upon transmission of the attribute information.

42. The apparatus of claim 39, wherein the at least one processor is further configured to:
transmit a group admittance message to one or more UEs of the group of UEs; and
receive a confirmation message indicating admission into the group of UEs.

43. The apparatus of claim 39, wherein the at least one processor is further configured to:
broadcast UE information to the group of UEs;
receive other UE information from one or more UEs of the group of UEs; and
determine that the UE is not a new leader of the group of UEs based on analysis of the UE information and the received other UE information.

44. The apparatus of claim 43, wherein the UE information comprises at least one of:
a remaining battery power value; or
a time of admission to the group of UEs.

45. The apparatus of claim 39, wherein the message is in a message-digest form.

46. A non-transitory computer-readable medium associated with a user equipment (UE) and storing computer executable code for wireless communication, comprising code for:
receiving, by the UE, attribute information from one or more UEs in a group of UEs, wherein the UE is a member of the group of UEs, and wherein the UE is a leader of the group of UEs;
generating group attribute information based on the received attribute information; and
broadcasting the group attribute information on behalf of the group of UEs to one or more other devices outside of the group of UEs.

47. The non-transitory computer-readable medium of claim 46, further comprising code for:
receiving UE information from each of the UEs in the group of UEs; and
determining that the UE is the leader of the group of UEs based on the UE information.

48. The non-transitory computer-readable medium of claim 47, wherein the UE information comprises a remaining battery life, and further code for determining that the UE has a remaining battery life greater than any of the UEs in the group of UEs.

49. The non-transitory computer-readable medium of claim 46, wherein the UE is selected as the leader of the group of UEs through a random process.

50. The non-transitory computer-readable medium of claim 46, further comprising code for:
receiving a group admittance message from a new UE;
adding the new UE to the group of UEs; and
receiving attribute information from the new UE.

51. The non-transitory computer-readable medium of claim 46, wherein the attribute information is received from the one or more UEs with a low transmit power.

52. The non-transitory computer-readable medium of claim 46, wherein the group attribute information comprises at last one of:
position information for the group of UEs;
speed information for the group of UEs;
size information for the group of UEs;
an indication of an intent to cross a road; or
a condition associated with one or more UEs in the group of UEs.

53. The non-transitory computer-readable medium of claim 46, further comprising code for:
receiving one or more messages from one or more other devices; and
transmitting a message to the group of UEs including the one or more basic safety messages in a message-digest form.

54. A non-transitory computer-readable medium associated with a user equipment (UE) and storing computer executable code for wireless communication, comprising code for:
transmitting, by the UE, attribute information to a leader UE of a group of UEs, wherein the UE is a member of the group of UEs;
prohibiting broadcasting of at least a portion of the attribute information outside of the group of UEs; and
receiving a message from the leader UE of the group of UEs that includes one or more basic safety messages from one or more other devices within the group of UEs, wherein the message that includes the one or more basic safety messages is received based on group attribute information associated with the group of UEs.

55. The non-transitory computer-readable medium of claim 54, wherein the attribute information is transmitted to the leader UE using a low transmit power.

56. The non-transitory computer-readable medium of claim 54, further comprising code for:
obtaining the attribute information from one or more modules associated with the UE; and
reducing a duty cycle for the one or more modules upon transmission of the attribute information.

57. The non-transitory computer-readable medium of claim 54, further comprising code for:
transmitting a group admittance message to one or more UEs of the group of UEs; and
receiving a confirmation message indicating admission into the group of UEs.

58. The non-transitory computer-readable medium of claim 54, further comprising code for:
broadcasting UE information to the group of UEs;
receiving other UE information from one or more UEs of the group of UEs; and
determining that the UE is not a new leader of the group of UEs based on analysis of the UE information and the received other UE information.

59. The non-transitory computer-readable medium of claim 58, wherein the UE information comprises at least one of:
a remaining battery power value; or
a time of admission to the group of UEs.

60. The non-transitory computer-readable medium of claim 54, wherein the message is in a message-digest form.

\* \* \* \* \*